Nov. 30, 1943.     E. GUSTAFSSON ET AL     2,335,508
FAN
Filed Sept. 5, 1942     3 Sheets-Sheet 3

Inventors:
Eric Gustafsson
John W. Baur
By Louis A. Bisson,
Attorney

Patented Nov. 30, 1943

2,335,508

UNITED STATES PATENT OFFICE 2,335,508

FAN

Eric Gustafsson and John W. Baur, Chicago, Ill., assignors to Binks Manufacturing Company, Chicago, Ill., a corporation of Delaware Application September 5, 1942, Serial No. 457,398

9 Claims. (Cl. 230—120)

The present invention relates to fans and more particularly to exhaust fans.

Among the objects of the invention is to provide a novel fan structure having a unitary and self-contained bearing structure which, when repair or replacement is necessary, can be easily and quickly detached as a unit and work performed on it as necessary and then as easily and quickly attached in place, thus avoiding the necessity of carrying the whole machine to and from the place of performing the work. The unit comprising the bearing housing, the bearing means, and the shaft, which as an aggregate is easily handled and machined.

When building fan structures it has been customary to make the bearing means for the fan an integral part of the whole apparatus. If the parts failed to line up or when the bearing wore and replacement was essential, it was necessary to perform the corrective work on the machine generally involving the transporting of the whole apparatus for that purpose. The present invention facilitates the work by making the bearing structure in a self-contained unitary construction or unit comprising a bearing housing which itself is readily attachable to and detachable from the structure in general, the shaft for the fan and the bearing for the shaft.

By such a structure it is facile to machine the bore of the bearing housing to the tolerance required for a press fit of the bearing assembly such as the ball bearing units and in case it is necessary to scrape or otherwise machine the bore of the bearing housing to bring it within the proper tolerance, that can easily be done without use of the whole apparatus.

Moreover, the assembling of the bearing unit or units, such as ball bearing assemblies, can be easily and efficiently effected by merely pressing them in place, as by an arbor press or the like, thus avoiding the former method of hammering them in place with the result of having damaged bearings.

Another feature of the invention is the facility of replacing the complete bearing housing quickly and easily while it is in service without loss of time in the use of the machine. The part that wears is the bearing or the parts thereof. Hence by use of the present invention it is facile to replace the worn bearing units, as the ball bearing cages and balls by a new set adapted to fit the detachable housing for the bearings. In that case all that is necessary is to send the unit comprising the housing, the shaft and the bearings to the shop for replacement of the bearing means by a new set, or the same may be replaced at the factory where the apparatus is in use, thus saving time in the stopping of the operation of the device.

Other objects, advantages, capabilities, features, and the like are comprehended by the invention as will later appear and as are inherently possessed by the invention.

Referring to the drawings.

Figure 1:
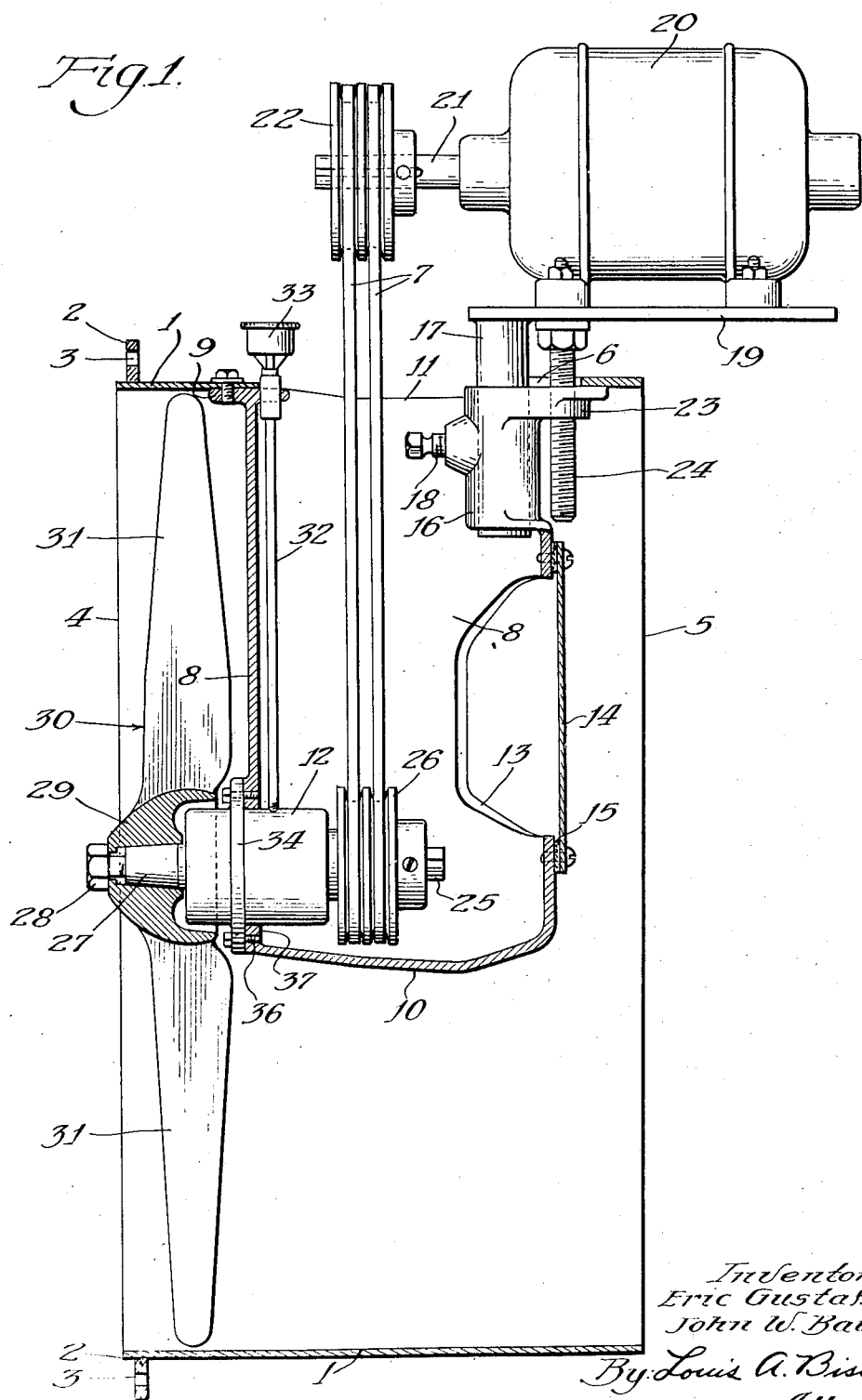
Fig. 1 is a vertical sectional view of an exhaust fan embodying my invention with parts shown in elevation.
Figure 2:
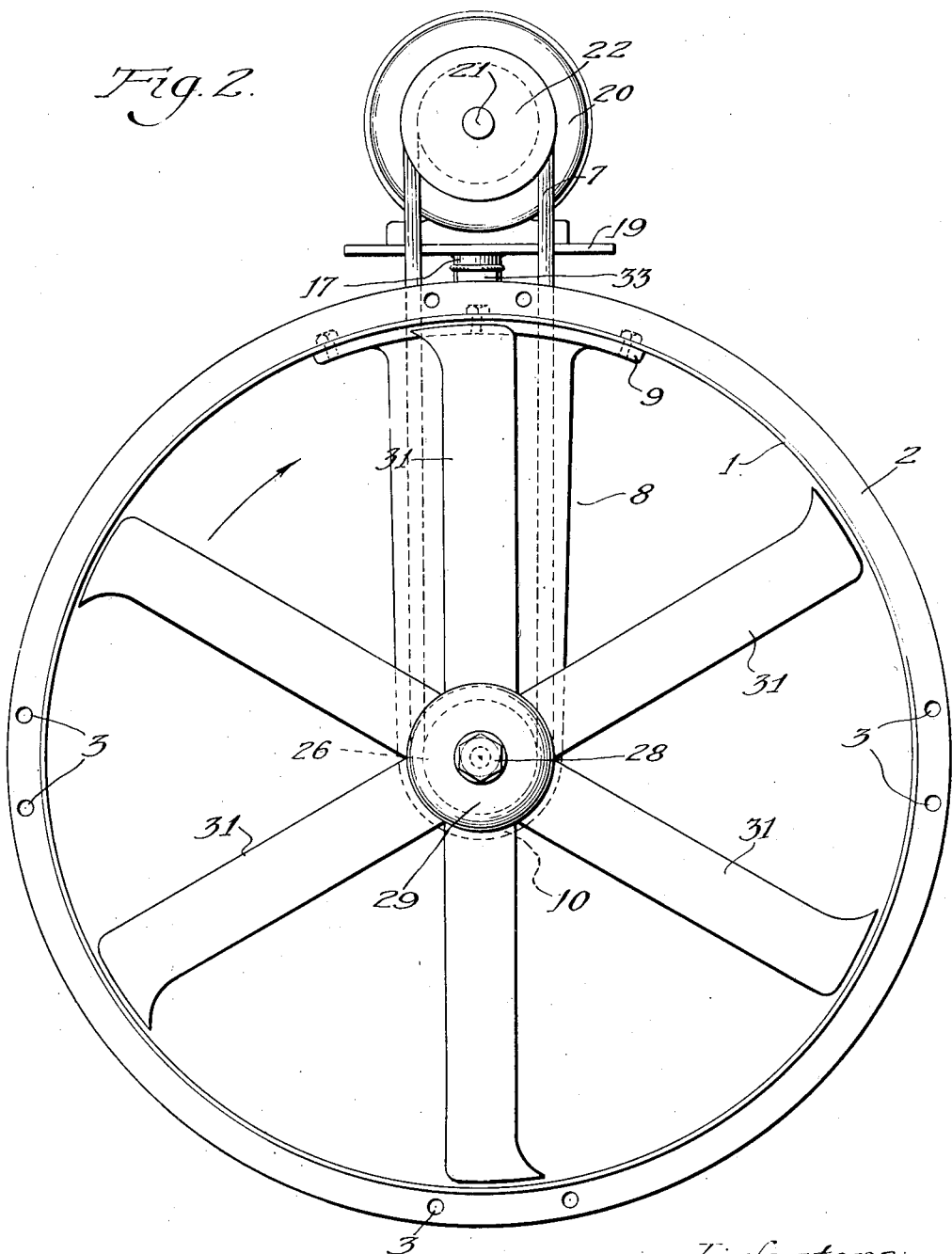
Fig. 2 is a front view in elevation.
Figure 3:
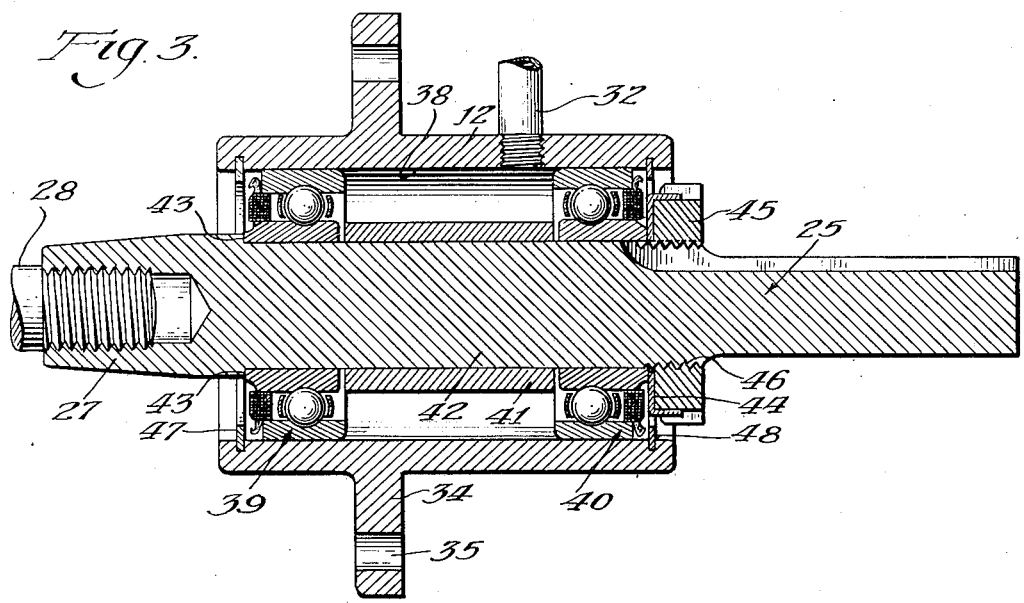
Fig. 3 is a longitudinal sectional view of the bearing feature.
Figure 4:
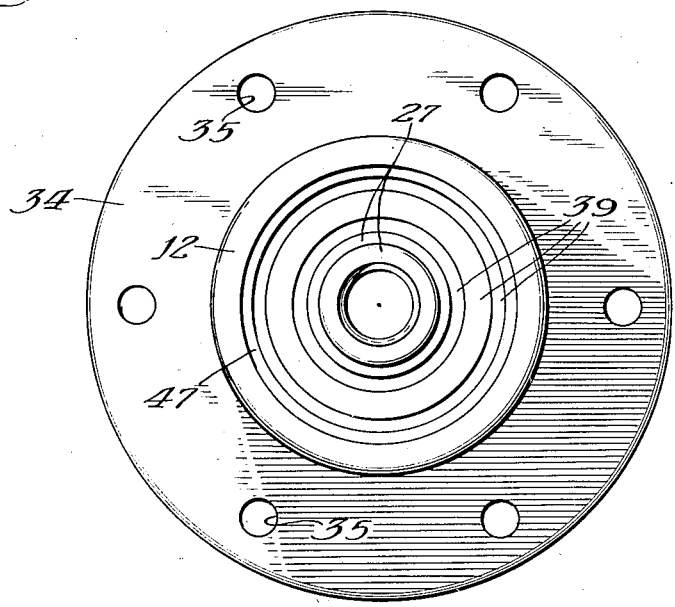
Fig. 4 is an end view in elevation of the structure shown in Fig. 3.

Referring more in detail to the drawings the embodiment chosen to illustrate the invention is shown as comprising a frame 1 of hollow cylindrical form having a flange 2 provided with suitable apertures 3 for the passing of securing means, as bolts or the like, for securing the frame in place with relation to the apparatus from which air, gases, or the like are to be exhausted, such as a spray booth in which articles are coated by spraying means, as a spray gun. This frame has openings 4 and 5 respectively at the front and rear ends thereof and has an upper opening 6 for the passage of a driving belt 7.

Secured to the upper part of the frame 1 and depending in it is a belt housing 8 having at its upper end a flange 9 fixed to the upper part of frame 1 by suitable securing means, such as screws, bolts or the like. The housing 8 is closed at its lower end 10 and has an opening 11 at its upper end for passage of the belt 7 and has an opening in its front wall for the extension therethrough of a bearing housing 12 and also a rear opening 13 normally closed by a plate 14 having suitable packing 15 and securing elements, such as screws, bolts or the like.

At the rear upper portion of the belt housing 8 is a hub 16 in which is slidably adjusted a post 17 held in adjusted position by a set screw 18. To the upper end of the post 17 is fixed a motor base 19 on which is a motor 20 having a shaft 21 suitably fastened, as by keying, to a pulley 22 for driving the belt 7. The hub 16 has a lug or bracket 23 in which is threaded a screw 24 which when adjusted up or down will move the motor and its support likewise, to give the proper tautness to the belt 7.

Within the bearing housing 12 is rotatably supported a shaft 25 to the inner portion of which is fastened a pulley 26, as by keying, driven by the belt 7, and to the outer end portion 27 of which is secured, as by a bolt or screw 28, the hub 29 of a fan 30 having fan blades 31. Extending upwardly from the bearing housing 12 is a lubricant duct 32 surmounted by a suitable grease cup 33 or the like.

The bearing housing 12 is readily attached to and detached from the belt housing. It comprises a flange 34 having apertures 35 for the passing of securing screws 36 for clamping the flange 34 to the rim portion 37 of the opening provided in the front wall of the belt housing 8 and through which extends the bearing housing 12. It is preferable that the apertures 35 be somewhat larger than the screws 36 to allow a certain amount of relative adjustment of the flange with relation to the screws and hence the rim portion 37 of the opening provided in the front wall of the belt housing 8 in accommodation of any variance in manufacture.

The bore 38 of the bearing housing 12 is machined to snugly receive with a tight fit a pair of bearing assemblies 39 and 40, such as of the ball bearing type or the like. These bearing assemblies are maintained in given spaced relation by a spacer 41 in the form of a sleeve fitted to an intermediate portion 42 of the shaft 25 with the bearing assemblies abutting the ends of the spacer 41. The bearing assembly 39 also abuts a shoulder 43 provided on the shaft 25 toward the forward end of the shaft and the other bearing assembly 40 abuts or is abutted by a lock washer 44 pressed by a lock nut 45 threaded to the threaded portion 46 of the shaft 25. In addition suitable snap rings 47 and 48 are provided within the end portions of the bearing housing 12.

The housing 12, bearings 39 and 40 and the shaft 25 in the aggregate constitute a self-contained and unitary assembly which can be readily detached, as a unit from the rest of the apparatus for whatever work that may be required to be performed on the unit or any of its parts, such as the inserting of new bearing assemblies 39 and 40 for those that may have been worn. The unit is then as readily replaced or attached to the apparatus. This obviates the necessity of transporting the whole apparatus to the shop or other place when repairs of the kind referred to are made.

While we have herein described and upon the drawings shown an illustrative embodiment of the invention, it is to be understood that the invention is not limited thereto but comprehends other constructions, details, arrangements of parts, features and the like without departing from the spirit of the invention.

Having thus disclosed the invention, we claim:

1. In a fan structure having a hollow frame open at its ends and a support fixed to a wall of the frame and extending inwardly to a central locus within the frame, a fan rotatably carried by the support to rotate within said frame, and means for driving the fan, a unitary bearing structure having a tubular housing detachably connected to the support at said central locus within said frame, bearing means carried by said housing, and a shaft rotatable in said bearing means and extending through said housing with the end portions thereof outside said housing, said fan and said driving means being connected to said end portions of said shaft, said support having at said central locus an opening through which extends said housing, said housing having intermediate its ends a radially extending flange overlapping the rim of the opening in said support, and means for readily attaching and detaching said flange to and from said rim.

2. In a fan structure having a frame with a support fixed thereto and depending therefrom, a fan rotatably carried by the support, and means for driving the fan, a unitary bearing structure detachably connected to the support and comprising a housing, bearing means having spaced bearing components carried by said housing and a shaft rotatable in said bearing means and extending through said housing with end portions outside said housing, the shaft being connected at an end thereof to the fan and at the other end thereof to said driving means, said shaft having a spacing means between said components, and said bearing means being connected to said shaft in abutting relation to said components.

3. In a fan structure having a frame with a support, a fan rotatably carried by the support, and means for driving the fan, a unitary bearing structure detachably connected to the support and comprising a housing, bearing means having spaced components carried by said housing and a shaft rotatable in said bearing means, the shaft being connected to the fan and to said driving means, said shaft having a spacing means between said components, and said bearing means components being connected to said shaft in abutting relation to said spacing means and fitting snugly within said housing with a tight fit.

4. In a fan structure having a frame with a support, a fan rotatably carried by the support, and means for driving the fan, a unitary bearing structure detachably connected to the support and comprising a housing, bearing means having spaced components carried by said housing and a shaft rotatable in said bearing means components, the shaft being connected to the fan and to said driving means, said housing having a bore in which said bearing means components fit snugly with a tight fit.

5. In a fan structure having a frame with a support, a fan rotatably carried by the support and means for driving the fan, a unitary bearing structure detachably connected to the support and comprising a housing, spaced bearing means carried by said housing and a shaft rotatable in said bearing means, the shaft being connected to the fan and to said driving means, said housing having a bore in which said bearing means fits snugly with a tight fit, said shaft having a spacing means between said bearing means, and said bearing means being connected to said shaft in abutting relation to said spacing means.

6. In a fan structure having a frame with a dependent supporting member provided with an opening therein, a fan rotatably carried by the supporting member, and means for driving the fan; a unitary tubular bearing structure extending through said opening and having a peripheral flange overlapping the rim portion of said member about said opening and having means for readily detachably securing said structure as a unit by way of said flange to said rim portion of the supporting member, a bearing means comprised within said unitary structure, and a shaft in said bearing means and having its end portions extending outwardly of the opposite ends of said unitary structure and having means on said end portions for attachment of said fan and said driving means respectively.

7. In a fan structure having a housing, a fan therein, driving means carried thereby, and a support fixed to the housing and rotatably supporting the fan; said support extending inwardly from a wall portion of the housing to a central locus within the housing and having an opening in the inwardly extending end portion of said support, a bearing unit extending through said opening and having a peripheral flange overlapping the rim portion of said opening in said inner end portion of the support, securing elements secured to said flange and said rim portion for detachably securing said unit to said support, and a shaft rotatably mounted in said bearing unit and having means at its ends for connection to the fan and to the driving means.

8. In a fan structure having a tubular housing, a support fixed at an end thereof to a wall portion of said housing and extending radially inwardly to an axial locus within said housing, the inner end portion of said support being free and being provided with an opening coaxial with the axis of the housing, driving means carried by the housing, and a fan rotatably carried by said support at the inner free end portion thereof; a tubular bearing unit extending through said opening and having a radial flange intermediate the ends thereof and extending in overlapping relation to the rim portion of said support about said opening, means for detachably securing said flange and said rim portion, a shaft rotatable in said unit and having its ends extending exteriorly of the ends of said unit, and having means at said ends of the shaft for connection to the fan and to the driving means.

9. In a fan structure having a hollow frame open at its ends, a support fixed to a wall of the frame and extending radially inwardly to a central locus of the frame and having an opening at said central locus, a unitary bearing structure having a hollow cylindrical housing extending through said opening and having a flange intermediate the ends of said housing and extending radially outwardly from said housing to the extent of overlapping the rim portion of said support at said opening, means for readily attaching and detaching said flange to and from said support at said rim portion of the support about said opening, bearing means in said housing, a shaft rotatable in said bearing means and having means for attaching a fan and driving means.

ERIC GUSTAFSSON.
JOHN W. BAUR.